(12) United States Patent
Kim et al.

(10) Patent No.: US 12,500,318 B2
(45) Date of Patent: Dec. 16, 2025

(54) BUTTON-TYPE SECONDARY BATTERY

(71) Applicant: LG ENERGY SOLUTION, LTD., Seoul (KR)

(72) Inventors: Min Gyu Kim, Daejeon (KR); Joo Hwan Sung, Daejeon (KR); Yong Gon Lee, Daejeon (KR); Min Su Cho, Daejeon (KR); Sang Hak Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 659 days.

(21) Appl. No.: 17/798,233

(22) PCT Filed: Jul. 14, 2021

(86) PCT No.: PCT/KR2021/009058
§ 371 (c)(1),
(2) Date: Aug. 8, 2022

(87) PCT Pub. No.: WO2022/015056
PCT Pub. Date: Jan. 20, 2022

(65) Prior Publication Data
US 2023/0143427 A1    May 11, 2023

(30) Foreign Application Priority Data
Jul. 14, 2020   (KR) ........................ 10-2020-0087138

(51) Int. Cl.
*H01M 50/595* (2021.01)
*H01M 10/12* (2006.01)
(Continued)

(52) U.S. Cl.
CPC ....... *H01M 50/595* (2021.01); *H01M 10/125* (2013.01); *H01M 10/285* (2013.01); *H01M 50/109* (2021.01); *H01M 50/538* (2021.01)

(58) Field of Classification Search
CPC ............ H01M 50/595; H01M 50/109; H01M 50/538; H01M 50/14; H01M 50/545;
(Continued)

(56) References Cited

U.S. PATENT DOCUMENTS

2002/0182494 A1   12/2002   Hayashi et al.
2004/0048151 A1    3/2004   Hayashi et al.
(Continued)

FOREIGN PATENT DOCUMENTS

CN   1468453 A   1/2004
CN   1992393 A   7/2007
(Continued)

OTHER PUBLICATIONS

CN_107195807_A Translated and original document (Year: 2017).*
(Continued)

*Primary Examiner* — Milton I Cano
*Assistant Examiner* — Katherine J Metzger
(74) *Attorney, Agent, or Firm* — Morgan, Lewis & Bockius LLP

(57) ABSTRACT

A button-type secondary battery includes an electrode assembly in which a negative electrode, a separator, and a positive electrode are layered wound in a state of being layered; a lower can in which the electrode assembly is mounted, and a space portion is defined as a surplus space in addition to a space in which the electrode assembly is mounted; an upper can coupled to the lower can to close the lower can in a state in which the electrode assembly is mounted in the lower can, and an electrolyte is injected; and a swelling member mounted in the lower can in a state of being coupled to an outer surface of the electrode assembly. When the electrolyte is injected, the swelling member absorbs the electrolyte to be expanded in volume within the space portion.

9 Claims, 5 Drawing Sheets

(51) Int. Cl.
*H01M 10/28* (2006.01)
*H01M 50/109* (2021.01)
*H01M 50/538* (2021.01)

(58) Field of Classification Search
CPC .. H01M 50/56; H01M 50/153; H01M 50/166;
H01M 50/489; H01M 50/147; H01M
50/10; H01M 50/183; H01M 50/216;
H01M 10/0431; H01M 10/04; H01M
10/0427; H01M 10/125; H01M 10/285;
Y02E 60/10; Y02P 70/50
See application file for complete search history.

(56) References Cited

U.S. PATENT DOCUMENTS

| | | |
|---|---|---|
| 2005/0031952 A1 | 2/2005 | Hayashi et al. |
| 2007/0154787 A1 | 7/2007 | Jang et al. |
| 2008/0138705 A1 | 6/2008 | Syvertsen et al. |
| 2012/0115025 A1 | 5/2012 | Kim et al. |
| 2013/0330601 A1 | 12/2013 | Mizuta et al. |
| 2015/0147640 A1 | 5/2015 | Kim et al. |
| 2017/0025703 A1 | 1/2017 | Pytlik et al. |
| 2018/0083305 A1 | 3/2018 | Kim et al. |
| 2019/0207265 A1 | 7/2019 | Kim et al. |
| 2020/0044276 A1 | 2/2020 | Sakai et al. |

FOREIGN PATENT DOCUMENTS

| | | | | |
|---|---|---|---|---|
| CN | 201868488 U | * | 6/2011 | |
| CN | 102694202 A | | 9/2012 | |
| CN | 107195807 A | | 9/2017 | |
| CN | 109786647 A | | 5/2019 | |
| CN | 109906526 A | | 6/2019 | |
| CN | 210224197 U | | 3/2020 | |
| EP | 1804320 A2 | * | 7/2007 | ................ C09J 7/20 |
| EP | 3151303 A1 | | 4/2017 | |
| EP | 2273601 B1 | * | 5/2018 | ........ H01M 10/0431 |
| JP | 2002-124219 A | | 4/2002 | |
| JP | 2002-134096 A | | 5/2002 | |
| JP | 2003-45381 A | | 2/2003 | |
| JP | 2003-288875 A | | 10/2003 | |
| JP | 2005-038673 A | | 2/2005 | |
| JP | 2006-066308 A | | 3/2006 | |
| JP | 2007-184238 A | | 7/2007 | |
| JP | 2007-294111 A | | 11/2007 | |
| JP | 2012-069455 A | | 4/2012 | |
| JP | 2012-133902 A | | 7/2012 | |
| JP | 2012-529753 A | | 11/2012 | |
| JP | WO2012/132373 A1 | | 7/2014 | |
| JP | 2016-54029 A | | 4/2016 | |
| JP | 2017-126421 A | | 7/2017 | |
| KR | 10-0719725 B1 | | 5/2007 | |
| KR | 10-2009-0088761 A | | 8/2009 | |
| KR | 10-2012-0025573 A | | 3/2012 | |
| KR | 10-2012-0035090 A | | 4/2012 | |
| KR | 10-2015-0111723 A | | 10/2015 | |
| KR | 10-2017-0138670 A | | 12/2017 | |
| KR | 10-2018-0031962 A | | 3/2018 | |
| KR | 10-2018-0047173 A | | 5/2018 | |
| KR | 10-2018-0127721 A | | 11/2018 | |
| KR | 20190099597 A | * | 8/2019 | |
| WO | WO-2010089152 A1 | * | 8/2010 | ........ H01M 10/0427 |

OTHER PUBLICATIONS

CN_201868488_U translated and original document (Year: 2011).*
EP_2273601_B1_M translated and original document (Year: 2018).*
EP_1804320_A2 original file and translation (Year: 2007).*
KR_20190099597_A original file and translation (Year: 2019).*
WO_2010089152_A1 original file and translation (Year: 2010).*
Translation_of_Akitani_et_al._JP_2003045381_A (Year: 2003).*
Office Action issued Jul. 29, 2023 for corresponding Chinese Patent Application No. 202180010748.8.
Office Action issued Aug. 15, 2023 for corresponding Japanese Patent Application No. 2022-543041.
International Search Report (with partial translation) and Written Opinion dated Oct. 26, 2021, for corresponding International Patent Application No. PCT/KR2021/009058.
Office Action issued on Apr. 16, 2025 in Korean Patent Application No. 10-2020-0087138.

* cited by examiner

BUTTON-TYPE SECONDARY BATTERY

CROSS-REFERENCE TO RELATED APPLICATION

The present application claims the benefit of the priority of Korean Patent Application No. 10-2020-0087138, filed on Jul. 14, 2020, which is hereby incorporated by reference in its entirety.

TECHNICAL FIELD

The present invention relates to a button-type secondary battery having a shape having a diameter greater than a height thereof, and more particularly, to a button-type secondary battery capable of buffering an impact by embedding a swelling member and preventing an electrode assembly from being unwound.

BACKGROUND ART

A button-type battery commonly used as a coin-type battery or a button-type battery has a thin button shape and is widely used in various devices such as remote controllers, clocks, toys, computer parts, and the like.

Such a button-type battery is mainly manufactured as a non-rechargeable primary battery, but is also widely manufactured as a secondary battery that is chargeable and dischargeable as miniaturized devices are developed. Also, the button-type secondary battery also has a structure in which an electrode assembly and an electrolyte are embedded in a case to repeatedly perform charging and discharging, like a cylindrical or pouch-type secondary battery.

FIG. 1 is a cross-sectional view of a button-type secondary battery according to a related art.

As illustrated in the drawing, a button-type secondary battery has a structure, in which an upper can 4 and a lower can 3 are coupled to each other. Here, each of the upper can 4 and the lower can 3 has a flat cylindrical shape having a diameter greater than a height thereof, and the upper can 4 has a diameter slightly greater than that of the lower can 3.

An electrode assembly 1, in which a positive electrode, a separator, and a negative electrode are stacked, and an electrolyte (not shown) are mounted in the lower can 3. The electrode assembly 1 has a structure in which the separator, the negative electrode, the separator, and the positive electrode are put in and wound on a rotating core in order, and a center pin 2 is inserted into a center hole from which the core is removed. Then, a negative electrode tab extending from the negative electrode and a positive electrode tab extending from the positive electrode protrude, and the negative electrode tab and the positive electrode tab are bonded to the lower can 3 and the upper can 4, respectively.

In addition, in order to prevent short circuit from occurring when the upper can 4 and the lower can 3 are coupled to each other, an end of the upper can 4 may be coupled to the lower can 3 while being bent to press a gasket 5 in a state in which the gasket 5 having no conductivity is disposed at a contact point at which the upper can 4 and the lower can 3 are in contact with each other.

DISCLOSURE OF THE INVENTION

Technical Problem

However, in the above-described coupling method, since coupling force is determined only by friction force between the gasket and the upper can and a pressure at which the end of the upper can presses the gasket, when an external impact is applied, the upper can and the lower can may be separated from each other.

In addition, there is a possibility that the external impact is transmitted to the internal electrode assembly to cause unwinding and damage of the wound electrode assembly.

Therefore, a main object of the present invention for solving the above problems is to provide a button-type secondary battery having a structure that is more robust to an external impact and is capable of buffering an impact transmitted to an electrode assembly.

Technical Solution

According to the present invention for achieving the above objects, a button-type secondary battery, in which an upper can and a lower can are coupled to each other when an electrode assembly is mounted in the lower can comprises: the electrode assembly in which a negative electrode, a separator, and a positive electrode are wound in a state of being stacked; the lower can in which the electrode assembly is mounted, and a space portion is formed as a surplus space in addition to a space in which the electrode assembly is mounted; the upper can coupled to the lower can to close the lower can in a state in which the electrode assembly is mounted in the lower can, and an electrolyte is injected; and a swelling member mounted in the lower can in a state of being coupled to an outer surface of the electrode assembly, wherein, when the electrolyte is injected, the swelling member absorbs the electrolyte to be expanded in volume within the space portion.

The lower can may comprise: a first sidewall formed upward along a circumference of a flat bottom surface; a first inclined portion formed in a shape of which a diameter gradually increases from an end of the first sidewall; and a first distal end extending in a direction parallel to the first sidewall from an end of the first inclined portion.

In addition, the upper can may comprise: a second sidewall formed downward along a circumference of a flat top surface and parallel to the first distal end; a second inclined portion formed to have a diameter that is gradually narrowed from an end of the second sidewall and being parallel to the first inclined portion; and a second distal end extending from an end of the second inclined portion so as to be parallel to the first sidewall.

The space portion may be formed using the first inclined portion, the first distal end, the top surface, and a side surface of the electrode assembly as boundaries.

A gasket may be formed between the first sidewall and the second distal end, between the first inclined portion and the second inclined portion, and between the first distal end and the second sidewall to prevent the upper can and the lower can from being in contact with each other.

An end of the gasket may protrude from the second distal end so as to be exposed to the outside.

At least two or more, i.e., a plurality of swelling members may be attached to the electrode assembly. In addition, any one of the swelling members may be expanded in volume that is different from that of the other.

The swelling member may be a swelling tape, and the swelling tape may be coupled to surround a circumference of the electrode assembly.

When the expansion of the swelling member in the space portion is completed, the surplus space may be formed in the space portion.

Furthermore, the present invention may additionally provide a secondary battery module in which the plurality of button-type secondary batteries having the above characteristics are connected to each other in parallel or in series.

Advantageous Effects

According to the present invention having the above-described technical characteristics, since the swelling member may absorb the electrolyte in the upper can and the lower can so as to be expanded in volume, it may be possible to buffer the external impact transmitted to the electrode assembly.

Thus, it may be possible to prevent the electrode assembly from being damaged, thereby further improving the durability of the secondary battery.

Since the space portion in which the swelling member is expanded is formed in the radial direction of the upper can and the lower can, the increase in height of the secondary battery may be suppressed.

In addition, since the top surface of the upper can has a diameter greater than that of the bottom surface of the lower can, the sealing performance may be further improved by coupling the upper can to the lower can in the press-fit method.

In addition, since the lower can and the upper can have the first inclined portion and the second inclined portion, respectively, it may be possible to reduce the impact applied to the gasket when the press-fitting is performed and to enable the more stable coupling.

At least two or more of the swelling members, i.e., the plurality of swelling members may be attached to the electrode assembly, and at least one of the swelling members may be expanded to be different in size from other swelling members, and thus, the internal space may be efficiently used according to the shape of the space portion.

Furthermore, the swelling member may be the swelling tape, and the swelling tape may be coupled to surround the circumference of the electrode assembly, thereby preventing the electrode assembly from being unwound.

In addition, the surplus space may be formed in the space portion, and thus, when the gas is generated therein, the surplus space may be used as the space in which the gas is collected.

MODE FOR CARRYING OUT THE INVENTION

Figure 1:
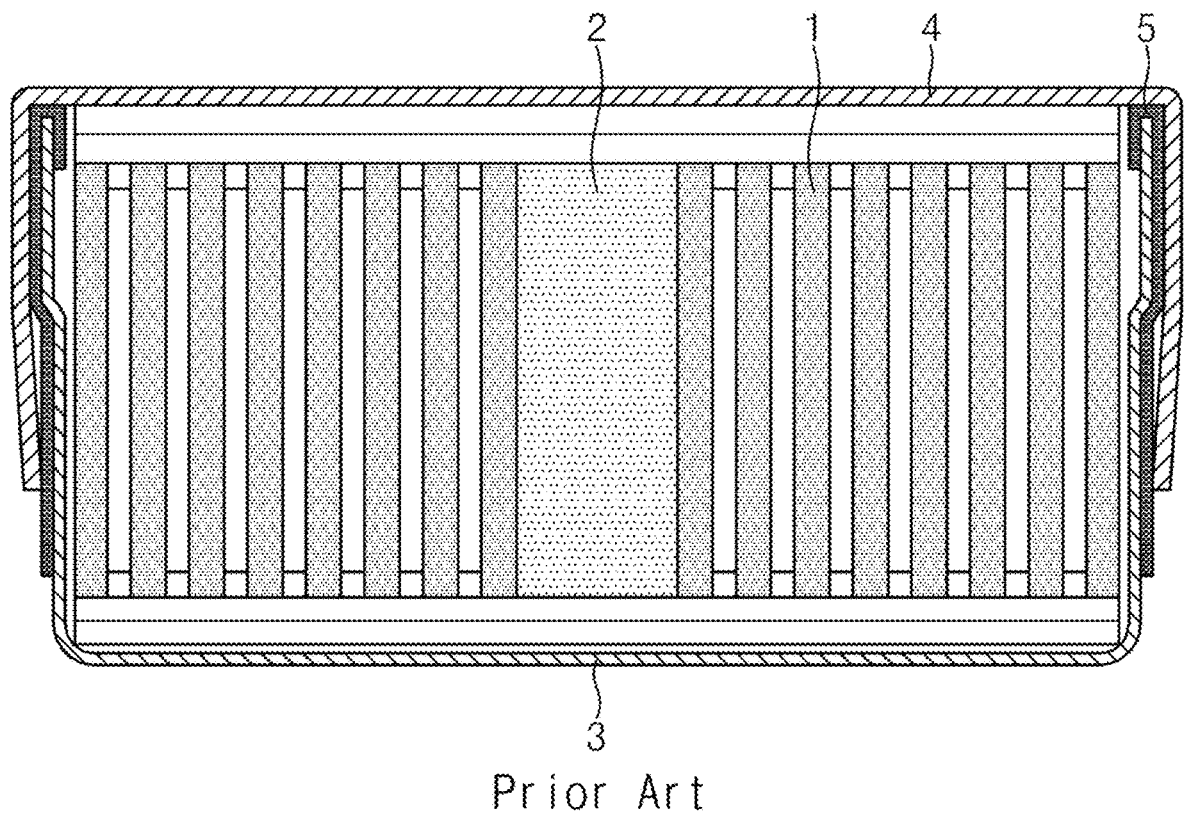
FIG. 1 is a longitudinal cross-sectional view of a button-type secondary battery according to the related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a button-type secondary battery having a diameter larger than a height thereof and comprises a swelling member 40 that is expanded in volume by absorbing an electrolyte. Hereinafter, embodiments of the present invention will be described in detail with reference to the accompanying drawings.

First Embodiment

Figure 2:
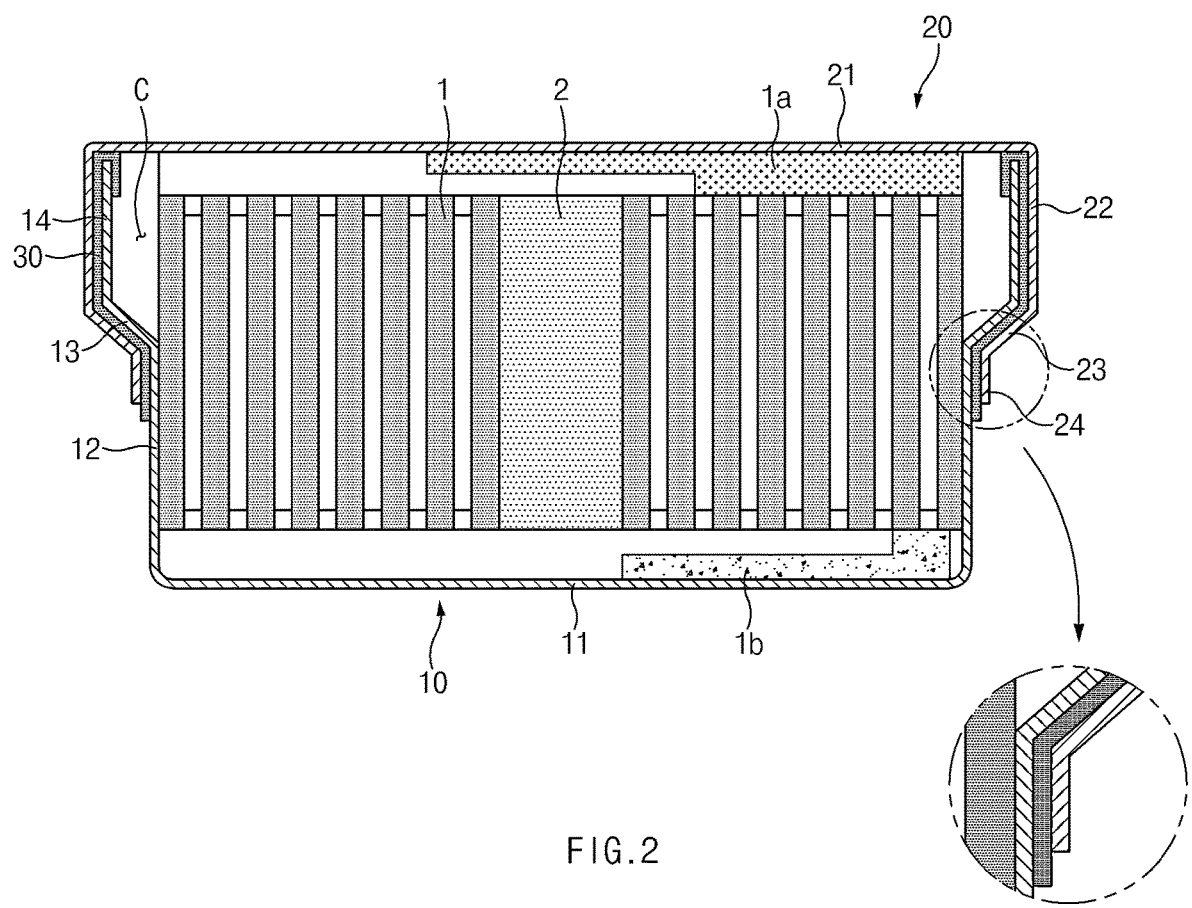
FIG. 2 is a longitudinal cross-sectional view illustrating a state in which a space portion is formed in a lower can according to an embodiment of the present invention.
Figure 3:
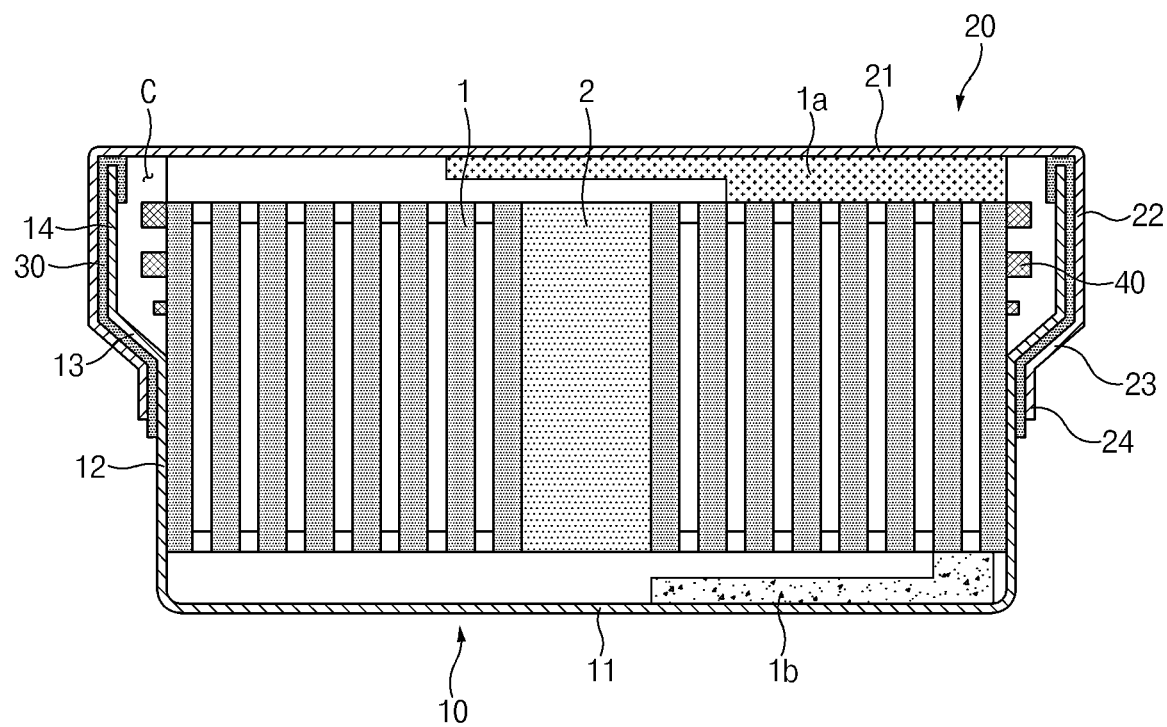
FIG. 3 is a longitudinal cross-sectional view illustrating a state in which an electrode assembly, in which a swelling member is coupled in the lower can, is mounted according to an embodiment of the present invention.

FIG. 2 is a longitudinal cross-sectional view illustrating a state in which a space portion C is formed in a lower can 10, and FIG. 3 is a longitudinal cross-sectional view illustrating a state in which an electrode assembly 1, in which a swelling member 40 is coupled in the lower can C, is mounted.

Referring to the drawings, in the present invention, the electrode assembly 1 is mounted in an upper can 20 and the lower can 10, the electrode assembly 1 is mounted in a state in which the swelling member 40 is coupled, and an electrolyte is injected before the upper can 20 and the lower can 10 are coupled to each other.

The electrode assembly 1 has a structure in which a negative electrode, a separator, and a positive electrode are wound in a state of being stacked. In addition, a positive electrode tab 1a extending from the positive electrode protrudes upward, and a negative electrode tab 1b extending from the negative electrode protrudes downward. Here, before the lower can 10 and the upper can 20 are coupled to each other, the positive electrode tab 1a is bonded to the upper can 20, and the negative electrode tab 1b is bonded to the lower can 10.

Then, the electrode assembly 1 is mounted in the lower can 10 having a cup shape. In the lower can 10, the space portion C is formed as a surplus space in addition to a space in which the electrode assembly 1 is mounted. That is, as shown in the drawing, an upper end of the lower can 10 has a structure that is expanded along a circumference thereof in a direction in which a diameter thereof increases.

In more detail, the lower can 10 comprises a first sidewall 12 formed upward along a circumference of a flat bottom surface 11, a first inclined portion formed in a shape of which a diameter gradually increases from an end of the first sidewall 12, and a first distal end 14 extending in a direction parallel to the first sidewall 12 from an end of the first inclined portion 13.

Also, the upper can 20 is coupled to the lower can 10 to close the lower can 10 in a state in which the electrode assembly 1 is mounted in the lower can 10, and the electrolyte is injected. The upper can 20 comprises a second sidewall formed downward along a circumference of a flat top surface 21 and parallel to the first distal end 14, a second inclined portion 23 formed to have a diameter that is gradually narrowed from an end of the second sidewall 22 and being parallel to the first inclined portion 13, and a second distal end 24 extending from an end of the second inclined portion 23 so as to be parallel to the first sidewall 12.

Thus, when the lower can 10 and the upper can 20 are coupled to each other, the space portion C is formed using the first inclined portion 13, the first distal end 14, the top surface 21, and a side surface of the electrode assembly 1 as boundaries.

Furthermore, as described above, since the upper can 20 is connected to the positive electrode, and the lower can 10 is connected to the negative electrode, a gasket 30 made of a material having an electrical insulation is inserted into the coupled points of the upper can 20 and the lower can 10 to prevent short circuit from occurring. That is, the gasket 30 is formed between the first sidewall 12 and the second distal end 24, between the first inclined portion 13 and the second inclined portion 23, and between the first distal end 14 and the second sidewall 22 to prevent the upper can 20 and the lower can 10 from being in contact with each other. Here, an end of the gasket 30 protrudes from the second distal end 24 by a predetermined length so that an end of the second distal end 24 is pressed.

Also, in this embodiment, the electrode assembly 1 is mounted in the lower can 10 in a state in which the swelling member 40 is coupled to an outer surface thereof. When the electrode assembly 1 is mounted in the lower can 10, the swelling member 40 is coupled to an upper portion of the electrode assembly 1 so as to be placed in the space portion C.

Figure 4:
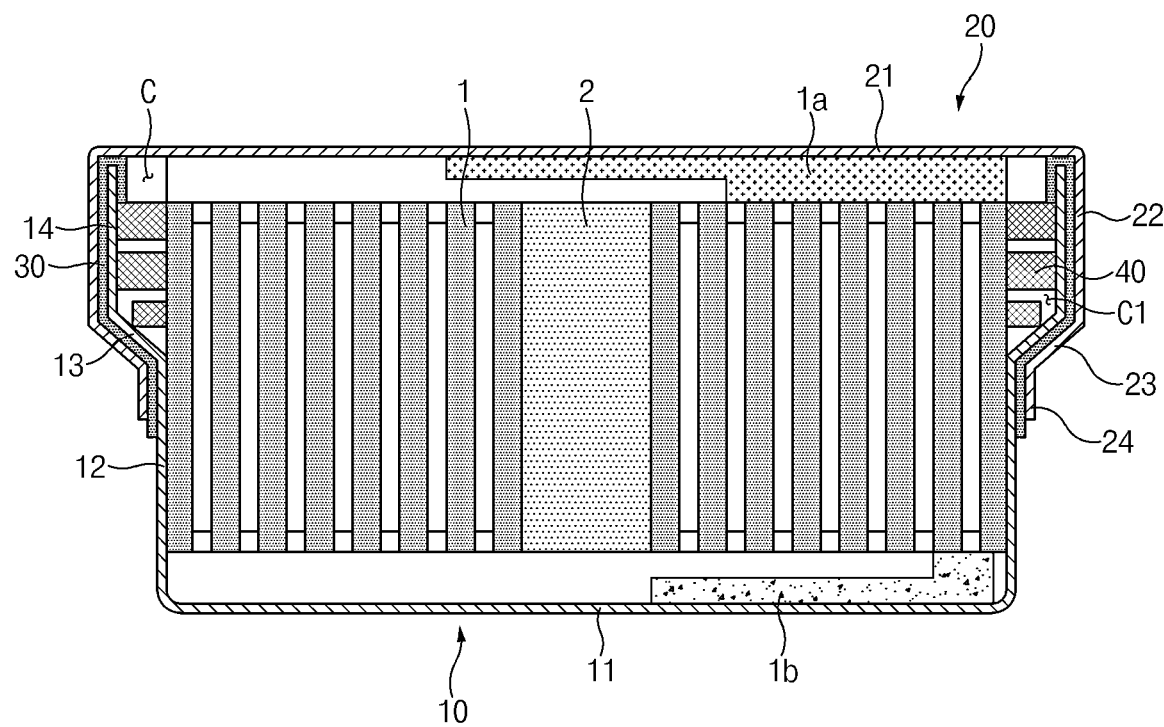
FIG. 4 is a longitudinal cross-sectional view illustrating a state when the swelling member of FIG. 3 is expanded.

When the electrolyte is injected into the lower can 10 after the electrode assembly 10 is mounted, the swelling member 40 absorbs the electrolyte and is expanded in volume. That is, as illustrated in FIG. 4 that illustrates a state when the swelling member 40 is expanded, the volume of the swelling member 40 is expanded in the space portion C by absorbing the electrolyte.

The expanded swelling member 40 may buffer an external impact transmitted to the electrode assembly 1. Thus, it may be possible to prevent the electrode assembly 1 from being damaged, thereby further improving durability of the secondary battery. In addition, in this embodiment, since the space portion C in which the swelling member 40 is expanded is formed in a radial direction of the upper can 20 and the lower can 10, an increase in height of the secondary battery may be suppressed.

When an impact is transmitted from the outside, the swelling member 40 may buffer impact energy transmitted to the electrode assembly 1 by discharging the absorbed electrolyte. Also, as time elapses, the swelling member 40 may again absorb the electrolyte so as to be maintained in buffering performance.

Second Embodiment

In this embodiment, a configuration in which at least two or more swelling members 40 are coupled to an electrode assembly 1 is provided.

That is, as illustrated in FIGS. 2 and 3, a plurality of swelling members 40 may be individually coupled to the electrode assembly 1. Here, expanded volumes of the swelling members 40 may be provided differently according to a size and shape of a space portion C.

For example, the lowermost swelling member 40 disposed on a first inclined portion 13 formed with a relatively small inner diameter is expanded to a relatively small size to match an inner diameter formed by the first inclined portion 13. However, each of the swelling members 40 disposed at the first distal end 14 and formed with a relatively larger inner diameter may be expanded to have a diameter greater than that of the lowermost swelling member 40.

Furthermore, in this embodiment, the swelling member 40 may be provided as a swelling tape that is capable of being wound around the electrode assembly 1.

That is, after the winding of a negative electrode, a separator, and a positive electrode, which constitute the electrode assembly 1, is completed, a tape provided to prevent unwinding may be provided as the swelling member 40. Thus, since the swelling tape 40 may be provided in an attached state during a process of manufacturing the electrode assembly 1, a separate additional assembling process for coupling the swelling member 40 may be deleted.

Here, the swelling tape may not be attached only to an end at which the winding of any one of the negative electrode, the separator, and the positive electrode is completed, but be attached to being wound around the entire electrode assembly 1 to more efficiently suppress the problem, in which the electrode assembly 1 is unwound by an external impact.

As the plurality of swelling members 40 are attached as described above, a surplus space C1 (see FIG. 5) may be formed in the space portion C.

Figure 5:
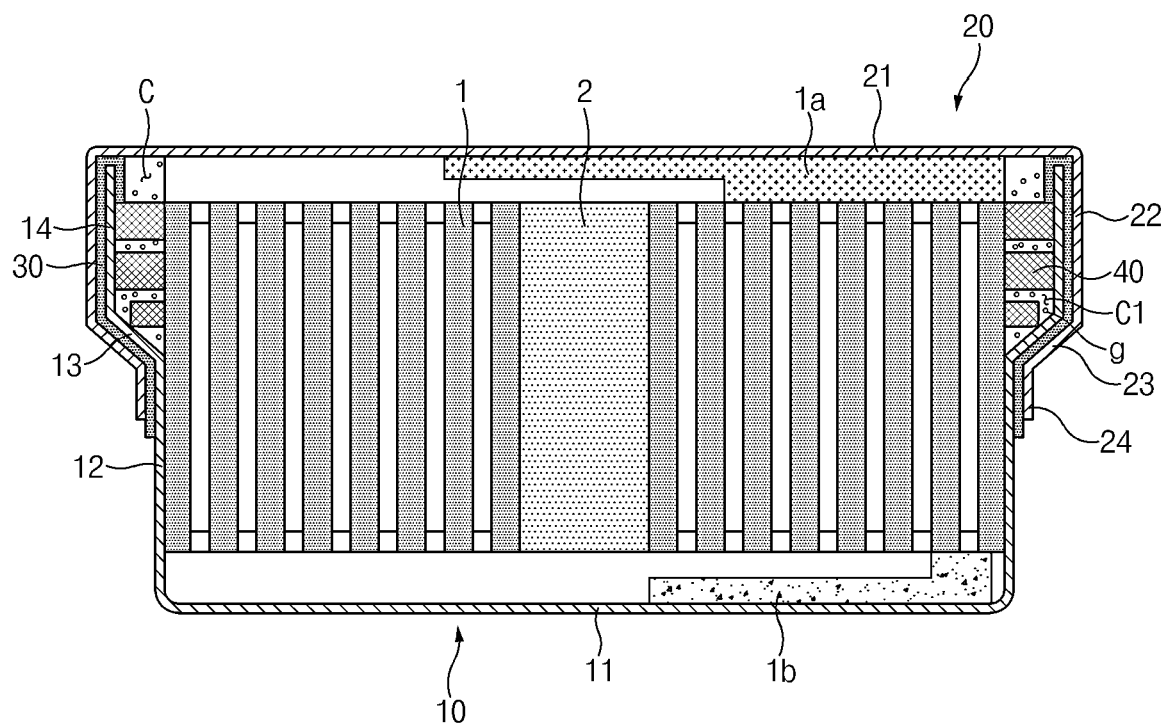
FIG. 5 is a longitudinal cross-sectional view illustrating a state in which a gas is collected into a surplus space of the space portion.

As illustrated in FIG. 5 that illustrates a state in which a gas is collected in the surplus space C1, a gas that is generated during charging and discharging of the secondary battery may be collected in the form of air bubbles g. As described above, as the air bubbles g are collected, swelling of the upper can 20 and/or the lower can 10 may be suppressed.

Therefore, in this embodiment, at least two or more. i.e., the plurality of swelling members 40 may be attached to the electrode assembly 1. Here, at least one of the swelling members 40 may be expanded in size that is different from that of the other and thus be expanded to match the shape of the space portion C to more efficiently utilize the inner space.

Furthermore, the swelling member 40 may be the swelling tape, and the swelling tape may be coupled to be wound around a circumference of the electrode assembly 1, thereby preventing the electrode assembly 1 from being unwound.

In addition, the surplus space C1 may be formed in the space portion C, and thus, when the gas is generated therein, the surplus space C may be used as the space in which the air bubbles are collected.

Furthermore, the present invention may additionally provide a secondary battery module in which the plurality of button-type secondary batteries having the above characteristics are connected to each other in parallel or in series.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

1: Electrode assembly
10: Lower can
11: Bottom surface
12: First sidewall
13: First inclined portion
14: First distal end
20: Upper can 21: Top surface
22: Second sidewall
23: Second inclined portion
24: Second distal end
30: Gasket
40: Swelling member.

The invention claimed is:

1. A button-type secondary battery, comprising:
an electrode assembly in which a negative electrode, a separator, and a positive electrode are layered wound in a state of being layered;
a lower can in which the electrode assembly is mounted, and a space portion is defined as a surplus space in addition to a space in which the electrode assembly is mounted;
an upper can coupled to the lower can to close the lower can in a state in which the electrode assembly is mounted in the lower can, and an electrolyte is injected; and
a swelling member mounted in the lower can in a state of being coupled to an outer surface of the electrode assembly,
wherein when the electrolyte is injected, the swelling member absorbs the electrolyte to be expanded in volume within the space portion,
wherein the lower can comprises:
a first sidewall formed upward along a circumference of a flat bottom surface;
a first inclined portion formed in a shape of which a diameter gradually increases from an end of the first sidewall; and
a first distal end extending in a direction parallel to the first sidewall from an end of the first inclined portion,
wherein the first inclined portion is formed to have a diameter that is tapered in from an end of the first distal end, and
wherein the upper can comprises:
a second sidewall formed downward along a circumference of a flat top surface and parallel to the first distal end;
a second inclined portion formed to have a diameter that is tapered in from an end of the second sidewall and being parallel to the first inclined portion; and
a second distal end extending from an end of the second inclined portion and parallel to the first sidewall.

2. The button-type secondary battery of claim 1, wherein the space portion defined by the first inclined portion, the first distal end, the flat top surface, and a side surface of the electrode assembly as boundaries.

3. The button-type secondary battery of claim 1, wherein a gasket is between the first sidewall and the second distal end, between the first inclined portion and the second inclined portion, and between the first distal end and the second sidewall to prevent the upper can and the lower can from being in contact with each other.

4. The button-type secondary battery of claim 3, wherein an end of the gasket protrudes from the second distal end to be exposed to an outside of the button-type secondary battery.

5. The button-type secondary battery of claim 1, wherein a plurality of swelling members are attached to the electrode assembly.

6. The button-type secondary battery of claim 5, wherein any one of the swelling members is expanded to have a volume that is different from that of the other ones of the swelling members.

7. The button-type secondary battery of claim 1, wherein the swelling member includes a swelling tape, and the swelling tape is coupled to surround a circumference of the electrode assembly.

8. The button-type secondary battery of claim 1, wherein, when the expansion of the swelling member in the space portion is completed, the surplus space is configured to collect gas generated during charging and discharging of the button-type secondary battery.

9. A secondary battery module comprising a plurality of button-type secondary batteries, each of the plurality of button-type secondary batteries including the button-type secondary battery of claim 1, wherein the plurality of button-type secondary batteries are electrically connected to each other.

* * * * *